United States Patent [19]

Morita et al.

[11] Patent Number: 5,387,624
[45] Date of Patent: Feb. 7, 1995

[54] METHOD FOR THE PREPARATION OF A POWDER MIXTURE COMPOSED OF CURED SILICONE MICROPARTICLES AND INORGANIC MICROPARTICLES

[75] Inventors: Yoshitsugu Morita, Chiba; Noriyasu Yokoyama, Tokyo, both of Japan

[73] Assignee: Dow Corning Toray Silicon Co., Ltd., Tokyo, Japan

[21] Appl. No.: 995,630

[22] Filed: Dec. 21, 1992

[30] Foreign Application Priority Data

Dec. 26, 1991 [JP] Japan ................... 3-358609

[51] Int. Cl.$^6$ ........................... C08K 7/00
[52] U.S. Cl. ................... 523/220; 524/588; 524/493; 524/449; 524/451
[58] Field of Search ........... 524/588, 493, 449, 451; 523/220

[56] References Cited

U.S. PATENT DOCUMENTS

| | | | |
|---|---|---|---|
| 3,824,208 | 7/1974 | Link | 260/375 B |
| 4,501,619 | 2/1985 | Gee | 106/287.12 |
| 4,582,874 | 4/1986 | Grape et al. | 524/588 |
| 4,678,815 | 7/1987 | Hoffman | 524/588 |
| 4,743,670 | 5/1988 | Yoshida et al. | 528/15 |
| 4,761,454 | 8/1988 | Oba et al. | 524/588 |
| 4,863,985 | 9/1989 | Pouchol et al. | 524/183 |
| 4,946,893 | 8/1990 | Saito et al. | 524/862 |
| 5,028,653 | 7/1991 | Desmonceau | 524/462 |
| 5,085,803 | 2/1992 | Wakita et al. | 252/511 |

FOREIGN PATENT DOCUMENTS

| | | |
|---|---|---|
| 0576057A1 | 2/1992 | European Pat. Off. |
| 64-70558 | 3/1989 | Japan |
| 03151099 | 5/1991 | Japan |

OTHER PUBLICATIONS

JP63309565 (Abstract).

*Primary Examiner*—Melvyn I. Marquis
*Assistant Examiner*—Karen A. Dean
*Attorney, Agent, or Firm*—Alexander Weitz

[57] ABSTRACT

A method for the preparation of a powder mixture of cured silicone microparticles and inorganic microparticles is disclosed, said method comprising (I) forming a water-based suspension of (A) a plurality of cured silicone microparticles having an average diameter of 0.1 to 200 micrometers, (B) a plurality of inorganic microparticles having an average particle diameter of 0.1 to 200 micrometers and, optionally, (C) at least one surfactant; and (II) removing the water from said water-based suspension. The resultant powder mixture is relatively free from agglomeration and may be easily dispersed in organic resins to form a homogeneous mixture for such applications as paints and coatings.

18 Claims, No Drawings

METHOD FOR THE PREPARATION OF A POWDER MIXTURE COMPOSED OF CURED SILICONE MICROPARTICLES AND INORGANIC MICROPARTICLES

FIELD OF THE INVENTION

The present invention relates to a method for the preparation of a powder mixture that is composed of cured silicone microparticles and inorganic microparticles (hereinafter also referred to as a CSM/IM powder mixture).

BACKGROUND OF THE INVENTION

Cured silicone microparticles are used, for example, as surface lubricants for organic resin films and as internal stress-relieving agents for thermosetting resins. In one method known for the preparation of cured silicone microparticles, a water-based suspension of cured silicone microparticles is prepared by curing a curable liquid silicone composition while said composition is emulsified in water (refer to Japanese Patent Application Laid Open Number Sho 63-77942 (77,942/1988), Japanese Patent Application Laid Open Number Sho 64-70558 ( 70,558/1989 ) and Japanese Patent Application Laid Open Number Sho 63-309565 (309,565/1988)). In this method, however, there is a strong tendency for the cured silicone microparticles to aggregate or agglomerate during removal of the water from the water-based suspension of the cured silicone microparticles. As a result, a drawback to this method is the formation of aggregates among the primary cured silicone microparticles. This type of cured silicone micropowder has heretofore been blended into organic resins by, for example, the following methods:

(a) the cured silicone microparticles are re-comminuted and blended into the organic resin;

(b) a homogeneous powder mixture-is first prepared by mixing the cured silicone microparticles with inorganic microparticles that are also to be blended into the organic resin, and this powder mixture is subsequently blended into the organic resin.

These methods for blending the prior cured silicone micropowders into organic resins have required either a device for re-comminuting the cured silicone microparticles or a mixing device for the purpose of preliminarily mixing the cured silicone microparticles and inorganic microparticles. Moreover, substantial time and labor inputs have been required in order to obtain a homogeneous mixture of the cured silicone microparticles and inorganic microparticles.

The present patent applicant has already proposed a method for preparing a cured silicone microparticle whose surface is coated with inorganic microparticles (refer to Japanese Patent Application Number Hei 3-151099. The cured silicone microparticles afforded by the preparative method proposed in Japanese Patent Application Number Hei 3-151099 do in fact have an excellent flowability. However, because inorganic microparticles blanket the surface of this cured silicone microparticle, the blends of such a product with organic resins can suffer from an attenuated interaction between the cured silicone and organic resin.

SUMMARY OF THE INVENTION

The present invention takes as its object the introduction of a highly productive method for the preparation of a uniform powder mixture composed of cured silicone microparticles and inorganic microparticles wherein the powder mixture obtained thereby is highly dispersible in organic resins. Thus, the present invention relates to a method for the preparation of a powder mixture composed of cured silicone microparticles and inorganic microparticles wherein said method is characterized by removing the water from a water-based suspension of a powder mixture that is composed of (A) cured silicone microparticles having an average particle diameter of 0.1 to 200 micrometers;

(B) inorganic microparticles having an average particle diameter of 0.1 to 200 micrometers; and optionally, (C) surfactant.

DETAILED DESCRIPTION OF THE INVENTION

The cured silicone microparticles constituting the component (A) of the preparative method of the present invention comprise the microparticles of a cured silicone gel, rubber, or resin having an average particle diameter of 0.1 to 200 micrometers, preferably 0.1 to 100 micrometers. For the purposes of the present invention, the average particle diameter or size is a number average which may be obtained, e.g., with a computerized image processor. The physical properties of component (A) are not specifically restricted, and they should be selected as appropriate for the particular application. The content of component (A) in the water-based suspension used in the preparative method of the present invention is not specifically restricted as long as the water-based suspension of the powder mixture retains fluidity. In specific terms, the component (A) content will be 0.1 to 90 weight % and preferably is 0.1 to 50 weight %.

The cured silicone microparticles comprising component (A) can be prepared by the microparticulation of a curable liquid silicone (preferably polydimethylsiloxane) composition in water or air followed by curing of the composition in this state. Curable liquid silicone compositions operable for this purpose are specifically but nonexhaustively exemplified as follows:

(i) organoperoxide-curing liquid silicone compositions composed of (a) alkenyl-containing organopolysiloxane and (b) organoperoxide;

(ii) addition reaction-curing liquid silicone compositions composed of (a') organopolysiloxane having at least 2 alkenyl groups in each molecule, (b') organopolysiloxane having at least 2 silicon-bonded hydrogen atoms in each molecule, and (c') platinum group metal compound;

(iii) condensation reaction-curing liquid silicone compositions composed of (a") silanol-endblocked diorganopolysiloxane, (b") organopolysiloxane having at least 2 silicon-bonded hydrogen atoms in each molecule, and (c") organotin compound; and (iv) condensation reaction-curing liquid silicone compositions composed of (a''') silanol-endblocked diorganopolysiloxane, (b''') hydrolyzable organosilare, and (c''') organotin compound or titanate ester.

These compositions may optionally contain reinforcing filler, extender filler, pigments, plasticizers, thermal stabilizers, and so forth.

The inorganic microparticle comprising the component (B) in the preparative method of the present invention should have an average particle diameter of 0.1 to 200 micrometers and preferably has an average particle diameter in the range of 0.1 to 100 micrometers. In a particularly preferred embodiment, the average particle diameter of component (B) is approximately equal to the average particle diameter of component (A), i.e., average particle diameter of component (B)/average particle diameter of component (A)=0.1 to 10. This condition affords a powder mixture with a particularly good flowability. Component (B) generally encompasses the inorganic microparticles known for addition to organic resins as fillers, but is not otherwise restricted in scope. Component (B) is specifically, but nonexhaustively, exemplified by the microparticulate forms of metal salts, such as precipitated calcium carbonate, heavy calcium carbonate, barium carbonate, magnesium carbonate, etc.; metal hydroxides, such as aluminum hydroxide, magnesium hydroxide, etc.; metal oxides, such as zirconium oxide, rutile titanium oxide, anatase titanium oxide, lead oxide (litharge, etc.), zinc oxide, zinc white, magnesium oxide, iron oxide (ferrite, iron oxide red, etc.), antimony oxide, etc.; natural silicic acids and silicates, such as aluminum silicate (zeolites, kaolinite, calcined clay, pyrophyllite, sericite, etc.), magnesium silicate, talc, calcium silicate (wollastonite, etc.), silicic acid (diatomaceous earth, silica sand, quartzite powder, etc.), etc.; synthetic anhydrous silicic acids and silicates, such as hydrated calcium silicate, hydrated aluminum silicate, anhydrous silicic acid (fumed silica, wet-method silica, etc.), etc.; nitrides, such as carbon nitride, boron nitride, silicon nitride, etc.; titanates, such as barium titanate, potassium titanate, etc.; as well as gypsum, slag, asbestos, carbon black, glass balloons, shirasu (i.e., volcanic ash) balloons, fly ash balloons, molybdenum disulfide, etc. The content of component (B) in the preparative method of the present invention is not specifically restricted as long as the water-based suspension of the powder mixture retains fluidity. In specific terms, the component (B) content should be 0.05 to 500 weight parts and preferably is 0.1 to 100 weight parts per 100 weight parts component (A).

The procedure for producing the water-based suspension of the CSM/IM powder mixture according to the present invention is nonexhaustively exemplified as follows:

(i) a water-based emulsion of a curable liquid silicone composition is first prepared, the inorganic micropowder is added, and the composition is then cured;

(ii) a water-based emulsion of a curable liquid silicone composition is first prepared, the composition is then cured, and the inorganic micropowder is subsequently added;

(iii) a water-based suspension of the inorganic micropowder is first prepared, a curable liquid silicone composition is then added, and this composition is subsequently dispersed and then cured;

(iv) a water-based emulsion of a curable liquid silicone composition and an inorganic micropowder is first prepared and the composition is then cured.

The water-based emulsion of a curable liquid silicone composition can be prepared by methods already known in the art. A specific example in this regard consists of preparation using an emulsifying device such as an homogenizer, colloid mill, etc.

In the preparative method according to the present invention, a surfactant (C) is preferably added during preparation of the water-based emulsion of the curable liquid silicone composition since this imparts an excellent stability to the water-based emulsion of the curable liquid silicone composition and also makes possible smaller particle sizes for the curable liquid silicone composition in the emulsion. Operable surfactants comprising component (C) are specifically exemplified by nonionic surfactants, such as polyoxyalkylene alkyl ethers, polyoxyalkylene alkylphenyl ethers, polyoxyalkylene alkyl esters, polyoxyalkylene sorbitan esters, polyethylene glycols, polypropylene glycols, diethylene glycol, ethylene oxide adducts of trimethylnonanol, etc.; anionic surfactants such as hexylbenzenesulfonic acid, octylbenzenesulfonic acid, decylbenzenesulfonic acid, dodecylbenzenesulfonic acid, cetylbenzenesulfonic acid, myristylbenzenesulfonic acid, sodium salts of the preceding, etc.; and cationic surfactants, such as octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, dioctadecyldimethylammonium hydroxide, beef tallow trimethylammonium hydroxide, cocotrimethylammonium hydroxide, etc. These may be used individually or in combinations of two or more. A particularly preferred component (C) consists of the combination of two nonionic surfactants in which the HLB value of one of the nonionic surfactants is less than 10 while the HLB value of the other is at least 10 and the difference in their HLB values is at least 5. The use of such a component (C) makes possible even further reductions in the average particle diameter of the cured silicone microparticles.

The preparative method of the present invention is characterized by the production of a homogeneous CSM/IM powder mixture through the removal of the water from the water-based suspension of the CSM/IM powder mixture. The actual technique for removing the water from the water-based suspension of the CSM/IM powder mixture is specifically but nonexhaustively exemplified by (i) drying the water-based suspension of the CSM/IM powder mixture in an oven, (ii) drying the suspension in a spray drier, etc.

Contemplated applications for the homogeneous CSM/IM powder mixture afforded by the preparative method of the present invention are as a powder for addition to paints and coatings and as a powder for use in cosmetics.

EXAMPLES

The present invention will be explained in greater detail through illustrative examples. The viscosity values reported in the examples were measured at 25° C.

EXAMPLE 1

A curable liquid silicone composition was prepared by mixing the following to homogeneity: 50 weight parts dimethylvinylsiloxy-endblocked dimethylpolysiloxane with a viscosity of 400 centipoise, 1.5 weight parts trimethylsiloxy-endblocked methylhydrogenpolysiloxane with a viscosity of 20 centipoise, $7.5 \times 10^{-3}$ weight parts tetramethyltetravinylcyclotetrasiloxane, and sufficient isopropanolic chloroplatinic acid solution to give 120 ppm platinum metal based on the total siloxane weight. To this curable liquid silicone composition was added 0.5 weight parts polyoxyethylene nonylphenyl ether (HLB value=5.7). Into the resulting mixture was dripped an aqueous solution prepared from 2 weight parts polyoxyethylene octylphenyl ether (HLB value=18.1) and 10 weight parts pure water. This aqueous solution was dripped into the mixture over approximately 5 minutes with stirring. After then stirring at 600 rpm for approximately 1 hour, the product was passed through a colloid mill to give an emulsion. This emulsion was subsequently introduced into pure water to obtain 15 weight % solids in the emulsion, thereby affording a homogeneous water-based emulsion of the curable liquid silicone composition. A water-based suspension of silicone microparticles was prepared by heating the emulsion for 20 minutes at 70° C. in order to cure the curable liquid silicone composition. A sample was taken from this water-based silicone microparticle suspension, and the water was removed from this sample at room temperature. The silicone microparticles had a maximum particle diameter of 5 micrometers and an average particle diameter of 1 micrometer.

The water-based suspension of a powder mixture was prepared by the addition of 15 weight parts talc micropowder (average particle diameter = 1.8 micrometers) to 100 weight parts of the above water-based silicone microparticle suspension with stirring at 300 rpm for approximately 30 minutes. This water-based powder mixture suspension was dried using a spray drier to yield a highly flowable silicone microparticle/talc microparticle powder mixture. Scanning electron micrographs of this powder mixture demonstrated that silicone microparticle aggregates were absent and that the silicone microparticles and talc microparticles were homogeneously mixed.

APPLICATION EXAMPLE 1

A liquid epoxy resin composition was prepared by mixing 10 weight parts of the powder mixture prepared in Example 1 with 90 weight parts of a liquid epoxy resin composition that was curable by heating for 1 hour at 150° C. It was observed that the powder mixture could be very easily mixed into the liquid epoxy resin composition and that the powder mixture became very intimately and homogeneously dispersed into the liquid epoxy resin composition. The resulting liquid epoxy resin composition was coated on an aluminum plate and cured by heating for 1 hour at 150° C. The post-cure film thickness was 80 micrometers, and the surface of this film was uniform and smooth.

COMPARISON EXAMPLE 1

A curable liquid silicone composition was prepared by mixing the following to homogeneity: 50 weight parts dimethylvinylsiloxy-endblocked dimethylpolysiloxane with a viscosity of 400 centipoise, 1.5 weight parts trimethylsiloxy-endblocked methylhydrogenpolysiloxane with a viscosity of 20 centipoise $7.5 \times 10^{-3}$ weight parts tetramethyltetravinylcyclotetrasiloxane, and sufficient isopropanolic chloroplatinic acid solution to give 120 ppm platinum metal based on the total siloxane weight. To this curable liquid silicone composition was added 0.5 weight parts polyoxyethylene nonylphenyl ether (HLB value=5.7). Into the resulting mixture was dripped an aqueous solution prepared from 2 weight parts polyoxyethylene octylphenyl ether (HLB value=18.1) and 10 weight parts pure water. This aqueous solution was dripped into the mixture over approximately 5 minutes with stirring. After stirring at 600 rpm for approximately 1 hour, the product was passed through a colloid mill to give an emulsion. This emulsion was subsequently introduced into pure water to obtain 15 weight % solids in the emulsion, thereby affording a homogeneous water-based emulsion of the curable liquid silicone composition. A water-based suspension of silicone microparticles was prepared by heating the emulsion for 20 minutes at 70° C. in order to cure the curable liquid silicone composition.

This water-based silicone microparticle suspension was dried using a spray drier. The resulting silicone microparticles had a maximum particle diameter of 5 micrometers and an average particle diameter of 1 micrometer and were partially aggregated. Fifteen weight parts of this silicone micropowder and 15 weight parts talc micropowder (average particle diameter=1.8 micrometers) were mixed for 12 hours using a motorized orbiting mortar-and-pestle mixer to yield a silicone microparticle/talc microparticle powder mixture. Scanning electron micrographs of this powder mixture demonstrated that the silicone microparticles were partially aggregated and that the silicone microparticles and talc microparticles were not uniformly mixed.

A liquid epoxy resin composition was prepared by mixing 10 weight parts of this powder mixture with 90 weight parts of a liquid epoxy resin composition that was curable by heating for 1 hour at 150° C. This powder mixture was very difficult to mix into the liquid epoxy resin composition and, moreover, became only coarsely dispersed in the liquid epoxy resin composition. The resulting liquid epoxy resin composition was coated on an aluminum plate and cured by heating for 1 hour at 150° C. The post-cure film thickness was 80 micrometers. Inspection of this film revealed the presence of silicone microparticle aggregates on the surface of the film.

EXAMPLE 2

A curable liquid silicone composition was prepared from 50 weight parts hydroxyl-endblocked dimethylpolysiloxane with a viscosity of 40 centipoise, 5.0 weight parts trimethylsioxy-endblocked methylhydrogenpolysiloxane with a viscosity of 20 centipoise, and 0.25 weight parts dibutyltin dioctoate. To this was added 0.5 weight parts polyoxyethylene nonylphenyl ether with HLB=5.7. Into the resulting mixture was dripped an aqueous solution prepared from 2 weight parts polyoxyethylene octylphenyl ether (HLB value=18.1) and 10 weight parts pure water. This aqueous solution was dripped into the mixture over approximately 5 minutes with stirring. After stirring at 600 rpm for approximately 1 hour, the product was run through a colloid mill and subsequently introduced into pure water to obtain 15 weight % solids in the emulsion. The final product was a homogeneous water-based emulsion of the curable liquid silicone composition. A water-based suspension of silicone microparticles was prepared by heating the emulsion for 20 minutes at 70° C. in order to cure the curable liquid silicone composition. A sample was taken from this water-based silicone microparticle suspension, and the water was removed from this sample at room temperature. The silicone microparticles had a maximum particle diameter of 5 micrometers and an average particle diameter of 1 micrometer.

A homogeneous water-based powder mixture suspension was obtained by the addition of 15 weight parts mica microparticles (average particle diameter=approximately 8 micrometers) to 100 weight parts of this water-based silicone microparticle suspension with stirring at 300 rpm for approximately 30 minutes. This water-based powder mixture suspension was dried in a spray drier to yield a highly flowable silicone microparticle/mica microparticle powder mixture.

APPLICATION EXAMPLE 2

A liquid epoxy resin composition was prepared by mixing 10 weight parts of the powder mixture prepared in Example 2 with 90 weight parts of a liquid epoxy resin composition that was curable by heating for 1 hour at 150° C. It was observed that this powder mixture could be very easily mixed into the liquid epoxy resin composition and that the powder mixture became very intimately and homogeneously dispersed into the liquid epoxy resin composition. The resulting liquid epoxy resin composition was coated on an aluminum plate and cured by heating for 1 hour at 150° C. The post-cure film thickness was 80 micrometers, and the surface of this film was uniform and smooth.

COMPARISON EXAMPLE 2

A curable liquid silicone composition was prepared from 50 weight parts hydroxyl-endblocked dimethylpolysiloxane with a viscosity of 40 centipoise, 5.0 weight parts trimethylsiloxy-endblocked methylhydrogenpolysiloxane with a viscosity of 20 centipoise, and 0.25 weight parts dibutyltin dioctoate. To this was added 0.5 weight parts polyoxyethylene nonylphenyl ether (HLB value=5.7). Into the resulting mixture was dripped an aqueous solution prepared from 2 weight parts polyoxyethylene octylphenyl ether (HLB value=18.1) and 10 weight parts pure water. This aqueous solution was dripped into the mixture over approximately 5 minutes with stirring. After stirring at 600 rpm for approximately 1 hour, the product was run through a colloid mill and subsequently introduced into pure water to obtain 15 weight % solids in the emulsion. The final product was a homogeneous water-based emulsion of the curable liquid silicone composition. A water-based suspension of silicone microparticles was prepared by heating the emulsion for 20 minutes at 70° C. in order to cure the curable liquid silicone composition. Silicone microparticles were obtained by drying this water-based silicone microparticle suspension using a spray drier.

Fifteen weight parts of this silicone micropowder and 15 weight parts mica micropowder (average particle diameter=approximately 8 micrometers) were mixed for 12 hours using a motorized orbiting mortar-and-pestle mixer to yield a silicone microparticle/mica microparticle powder mixture. A liquid epoxy resin composition was prepared by mixing 10 weight parts of this powder mixture with 90 weight parts of a liquid epoxy resin composition that was curable by heating for 1 hour at 150° C. This powder mixture was very difficult to mix into the liquid epoxy resin composition and, moreover, became only coarsely dispersed in the liquid epoxy resin composition. The resulting liquid epoxy resin composition was coated on an aluminum plate and cured by heating for 1 hour at 150° C. The post-cure film thickness was 80 micrometers. Inspection of this film demonstrated the presence of silicone microparticle aggregates on the surface of the film.

EXAMPLE 3

A curable liquid silicone composition was prepared by mixing the following to homogeneity: 50 weight parts dimethylvinylsiloxy-endblocked dimethylpolysiloxane with a viscosity of 400 centipoise, 1.5 weight parts trimethylsiloxy-endblocked methylhydrogenpolysiloxane with a viscosity of 20 centipoise, $7.5 \times 10^{-3}$ weight parts tetramethyltetravinylcyclotetrasiloxane, and sufficient isopropanolic chloroplatinic acid solution to give 120 ppm platinum metal based on the total siloxane weight. An emulsion was prepared by stirring this curable liquid silicone composition in 100 weight parts pure water at 600 rpm for approximately 1 hour followed by passage through a colloid mill. This emulsion was subsequently introduced into pure water to obtain 15 weight % solids in the emulsion, thereby affording a homogeneous water-based emulsion of the curable liquid silicone composition. A water-based suspension of silicone microparticles was prepared by heating the emulsion for 20 minutes at 70° C. in order to cure the curable liquid silicone composition. A sample was taken from this water-based silicone microparticle suspension, and the water was removed from this sample at room temperature. The silicone microparticles afforded thereby had an average particle diameter of 20 micrometers.

The water-based suspension of a powder mixture was prepared by the addition of 15 weight parts wet-method silica microparticles (average particle diameter=5 micrometers) to 100 weight parts of this water-based silicone microparticle suspension with stirring at 300 rpm for approximately 30 minutes. This water-based powder mixture suspension was dried using a spray drier to yield a highly flowable silicone microparticle/wet-method silica microparticle powder mixture. Scanning electron micrographs of this powder mixture demonstrated that silicone microparticle aggregates were absent and that the silicone microparticles and wet-method silica microparticles were homogeneously mixed.

APPLICATION EXAMPLE 3

A liquid epoxy resin composition was prepared by mixing 10 weight parts of the powder mixture prepared in Example 3 with 90 weight parts of a liquid epoxy resin composition that was curable by heating for 1 hour at 150° C. It was observed that the powder mixture could be very easily mixed into the liquid epoxy resin composition and that the powder mixture became homogeneously dispersed into the liquid epoxy resin composition. The resulting liquid epoxy resin composition was coated on an aluminum plate and cured by heating for 1 hour at 150° C. The post-cure film thickness was 80 micrometers, and the surface of this film was uniform and smooth.

That which is claimed is:

1. A method for the preparation of a powder mixture of cured silicone microparticles and inorganic microparticles comprising (I) forming a water-based suspension of (A) a plurality of cured silicone microparticles having an average diameter of 0.1 to 200 micrometers, and (B) a plurality of inorganic microparticles having an average particle diameter of 0.1 to 200 micrometers; and (II) removing the water from said water-based suspension.

2. The method according to claim 1, wherein the average )particle diameter of said cured silicone microparticles and said inorganic microparticles is 0.1 to 100 micrometers.

3. The method according to claim 2, wherein the ratio of the average particle diameter of said inorganic microparticles to the average particle diameter of said cured silicone microparticles is 0.1 to 10 and wherein said component (A) consists essentially of a cured polydimethylsiloxane.

4. A method for the preparation of a powder mixture of cured silicone microparticles and inorganic microparticles comprising
(I) forming a water-based suspension of
(A) a plurality of cured silicone microparticles having an average diameter of 0.1 to 200 micrometers,
(B) a plurality of inorganic microparticles having an average particle diameter of 0.1 to 200 micrometers, and
(C) at least one surfactant; and
(II) removing the water from said water-based suspension.

5. The method according to claim 4, wherein the average particle diameter of said cured silicone microparticles and said inorganic microparticles is 0.1 to 100 micrometers.

6. The method according to claim 5, wherein the ratio of the average particle diameter of said inorganic microparticles to the average particle diameter of said cured silicone microparticles is 0.1 to 10 and wherein said component (A) consists essentially of polydimethylsiloxane.

7. The method according to claim 4, wherein said component (C) is a combination of two nonionic surfactants wherein the HLB value of the first surfactant is $<10$ and the HLB value of the second surfactant is $\geq 10$ with the proviso that the difference in these HLB values is at least 5.

8. The method according to claim 5, wherein said component (C) is a combination of two nonionic surfactants wherein the HLB value of the first surfactant is $<10$ and the HLB value of the second surfactant is $\geq 10$ with the proviso that the difference in these HLB values is at least 5.

9. The method according to claim 6, wherein said component (C) is a combination of two nonionic surfactants wherein the HLB value of the first surfactant is $<10$ and the HLB value of the second surfactant is $\geq 10$ with the proviso that the difference in these HLB values is at least 5.

10. The method according to claim 1, wherein the water removal step (II) is accomplished in a spray drier.

11. The method according to claim 2, wherein the water removal step (II) is accomplished in a spray drier.

12. The method according to claim 3, wherein the water removal step ( II ) is accomplished in a spray drier.

13. The method according to claim 4, wherein the water removal step (II) is accomplished in a spray drier.

14. The method according to claim 5, wherein the water removal step (II) is accomplished in a spray drier.

15. The method according to claim 6, wherein the water removal step (II) is accomplished in a spray drier.

16. The method according to claim 7, wherein the water removal step (II) is accomplished in a spray drier.

17. The method according to claim 8, wherein the water remove step (II) is accomplished In a spray drier.

18. The method according to claim 9, wherein the water removal step (II) is accomplished in a spray drier.

* * * * *